Jan. 17, 1928.

J. SCHECHTER

KEY CUTTING MACHINE

Filed Nov. 14, 1925

INVENTOR.
Joseph Schechter,
BY
Frautzel and Richards
ATTORNEYS.

Jan. 17, 1928.
J. SCHECHTER
1,656,295
KEY CUTTING MACHINE
Filed Nov. 14, 1925
2 Sheets-Sheet 2
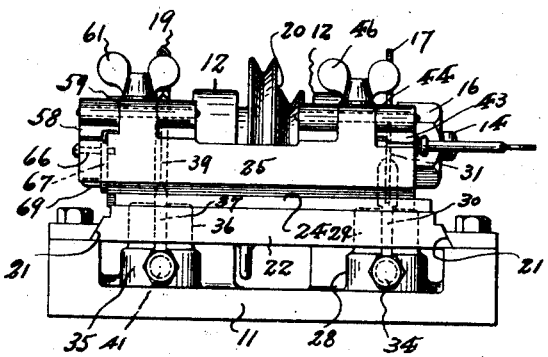
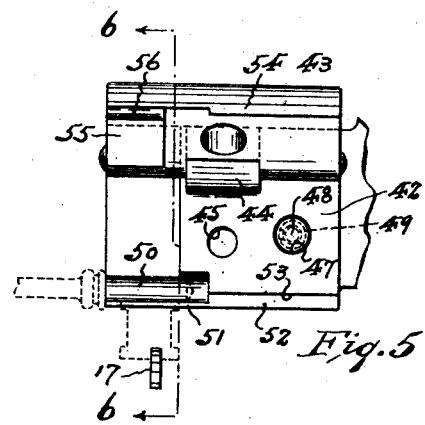
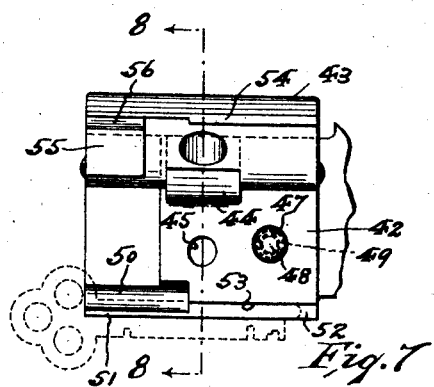
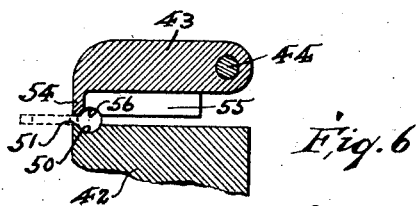
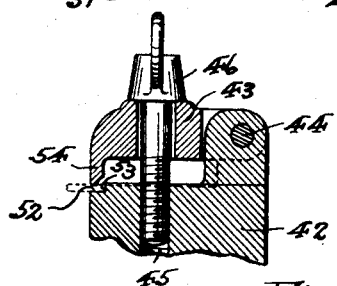
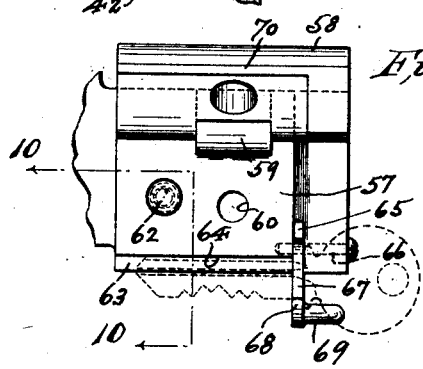
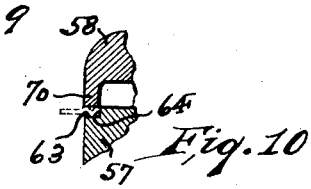
INVENTOR.
Joseph Schechter,
BY
Frantzef and Richards
ATTORNEYS.

Patented Jan. 17, 1928.

1,656,295

UNITED STATES PATENT OFFICE.

JOSEPH SCHECHTER, OF BROOKLYN, NEW YORK, ASSIGNOR TO ABRAHAM ROSENBERG, OF NEW YORK, N. Y.

KEY-CUTTING MACHINE.

Application filed November 14, 1925. Serial No. 68,959.

This invention relates, generally, to improvements in key-cutting machines; and the invention has reference, more particularly, to a universal type of key-cutting machine adapted for service in cutting or forming substantially all the commonly employed types of keys.

The invention has for its principal object to provide a simple, easily manipulated and compact universal key cutting machine; the same being equipped with a novel construction and arrangement of work holding and feeding means to cooperate both with the cutting tools or elements and with gauge elements.

The invention has for a more specific object, to provide a novel construction of adjustable gauge devices for a key cutting machine; and the invention has for a further specific object to provide novel forms and constructions of key clamping devices in connection with the work holding and feeding means of a key cutting machine.

Other objects of this invention, not at this time more particularly enumerated, will be clearly understood from the following detailed description of the same.

With the various objects of this invention in view, the same consists, primarily, in the novel construction of a universal key cutting machine hereinafter more fully set forth; and, the invention consists, furthermore, in the novel arrangements and combinations of the various devices and parts, as well as in the details of the construction of the same, all of which will be hereinafter more fully described, and then finally embodied in the appended claim.

The invention is clearly illustrated in the accompanying drawings, in which:—

Fig. 4 is a front elevation of the novel key cutting machine.

Figure 1:
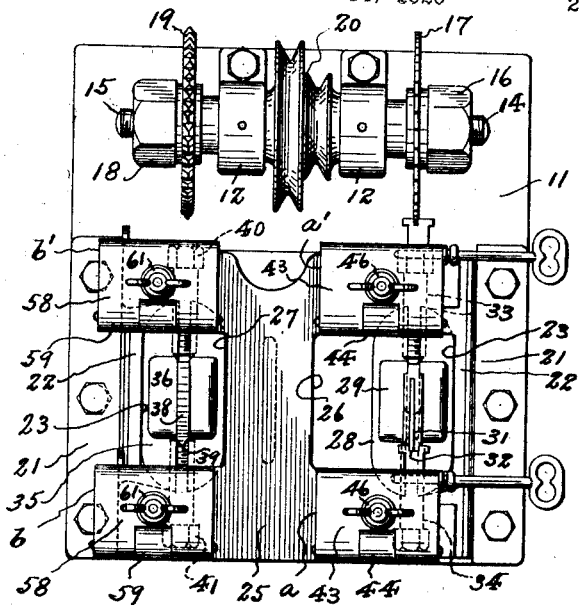
Fig. 1 is a plan view of the novel universal key cutting machine, made according to and embodying the principles of this invention.
Figure 2:
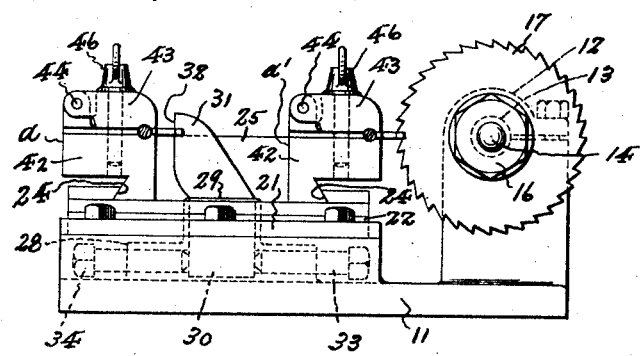
Fig. 2 is a side elevation of the key cutting machine.

Fig. 5 is a plan view of one form of key clamp element adapted to hold either bit keys or flat keys, said Fig. 5 showing the clamp in open position to disclose its internal construction and arrangement, and also showing how the clamp receives a bit key; Fig. 6 is a fragmentary transverse section on line 6—6 in Fig. 5, but showing the clamp closed to normal gripping relation to a bit key; Fig. 7 is a view similar to that shown in Fig. 5, but showing how said clamp receives a flat key; and Fig. 8 is a fragmentary transverse section on line 8—8 in Fig. 7, but showing the clamp closed to normal gripping relation to a flat key.

Fig. 9 is a plan view of another form of key clamp element with key positioning means, adapted to function with a pin or cylinder lock key, such, e. g. as a Yale lock key; and Fig. 10 is a fragmentary transverse section on line 10—10 in Fig. 9, but showing the clamp closed to normal gripping relation to the key.

Similar characters of reference are employed in all of the above-described views, to indicate corresponding parts.

Referring now to said drawings, the reference character 11 indicates a base-plate. Mounted on the rear end of said base-plate are a pair of upstanding bearing members 12, in which is journaled a spindle 13, having at one end a right hand threaded axial stud 14, and at its opposite end a left hand threaded axial stud 15. Secured to the one end of said spindle 13, by a nut 16 applied to the threaded stud 14, is a rotary cutting element 17; and in like manner, secured to the opposite end of said spindle 13, by a nut 18 applied to the threaded stud 15, is a second rotary cutting element 19. Fixed on said spindle 13, intermediate said bearing members 12, is a step pulley 20, whereby said spindle and its cutting elements may be driven at a selected rotary speed.

Connected with said base-plate 11, to extend longitudinally along the sides thereof from the rear end toward the front end thereof, are laterally spaced guide-ways 21 by which is slidably supported a longitudinally movable carriage 22. Said carriage 22 is provided with a central open part 23. Fixed on said carriage 22 are spaced transverse guideways 24 by which is slidably supported a transversely movable carriage 25.

Said carriage 25 is provided, on that side thereof which is opposed to the cutting element 17, with a pair of longitudinally alined clamp or vise elements $a$ and $a'$; and in like manner, is provided, on that side thereof which is opposed to the cutting element 19, with a second pair of longitudinally alined clamp or vise elements $b$ and $b'$. Said carriage 25 is cut away at each side intermediate the clamp or vise elements $a$ and $a'$, and intermediate the clamp or vise elements $b$ and $b'$, as indicated by the respective reference characters 26 and 27.

Connected with said base-plate 11 is a boss 28 provided with an upstanding guide-block 29, which extends upwardly through the open part 23 of said carriage 22 and into the open space 26 of the carriage 25 intermediate the clamp or vise elements $a$ and $a'$. Said boss and its guide-block is provided with a longitudinal slot or way, in which is movably fitted the main body 30 of an upwardly projecting gauge-piece 31, the forward vertical edge of which provides a stop-gauge 32 opposed to the clamp or vise element $a$. Said gauge-piece is adjustable toward and away from the front of said clamp or vise element $a$, the means for so adjusting while at the same time fixing the gauge piece in desired adjusted position, comprises a front screw 33 and a rear adjusting screw 34, which are respectively threaded longitudinally into the respective ends of said boss 28, so as to bear respectively on the front and rear ends of said main body 30 of the gauge piece.

Also mounted on said base-plate 11 is another boss 35 provided with an upstanding guide-block 36, which extends upwardly through the open part 23 of said carriage 22 and into the open space 27 of the carriage 25 intermediate the clamp or vise elements $b$ and $b'$. Said boss and its guide-block is provided with a longitudinal slot or way, in which is movably fitted the main body 37 of an upwardly projecting gauge-piece 38, the forward vertical edge of which provides a stop-gauge 39 opposed to the clamp or vise element $b$. Said gauge-piece 38 is adjustable toward and away from the front of said clamp or vise element $b$, the means for so adjusting while at the same time fixing the gauge-piece in desired adjusted position, comprises a front adjusting screw 40 and a rear adjusting screw 41, which are respectively threaded longitudinally into the respective ends of said boss 35, so as to bear respectively on the front and rear ends of the main body 37 of said gauge-piece 38.

The clamp or vise elements $a$ and $a'$ are the same in structure, and each consists of a stationary lower member 42, preferably forming an integral part of the carriage 25, and a movable upper member 43. Said upper member 43 is pivotally connected at its rear portion with the rear portion of said stationary lower member 42 by means of a suitable hinge connection 44. Said lower member 42 is provided with a screw threaded opening 45, and a thumb-screw 46 is passed downwardly through said upper member 43, to screw into said threaded opening 45, to thereby hold said upper member in gripping or clamping relation to the lower member. If desired, said lower member 42 may be provided with a socket 47 to slidingly receive an upwardly projecting push-pin 48, which is backed by a compression spring 49. Said push-pin 48, under the compulsion of the spring 49, bears against the under side of said upper member 43 to lift the same, when the holding pressure of the thumb-screw is relaxed. The clamp or vise elements $a$ and $a'$ are provided with key gripping means peculiarly adapted to selectively engage either bit-keys or flat keys. In connection with the lower member 42, the said gripping means comprises a semi-cylindrical pin-seat 50 which enters from the outer side of the member 42 so as to be located parallel to, but spaced slightly rearward of, its forward edge, to thus provide a bit gripping jaw 51 intermediate the pin-seat and the outer margin of the member 42. Beyond said pin-seat 50 in longitudinal extension along the forward marginal portion of said lower member 42, there is provided a continuation of the gripping jaw, as at 52, which extends rearward to a longitudinal step or stop shoulder 53, and which serves as a gripping jaw adapted for engagement with the body of a flat key. In connection with the upper member 43, the said gripping means comprises, along its free longitudinal edge, an upper depending gripping jaw 54. Extending rearwardly from said upper gripping jaw 54, adjacent to the outer side, is clamp-block 55, the under surface of which is flush with the biting surface of said gripping jaw 54. Formed in said clamp-block 55 is an upper semi-cylindrical pin-seat 56, which is adapted to be opposed to the pin-seat 50 of the lower clamp or vise element 42.

The clamp or vise elements $b$ and $b'$ are also the same in structure, and each consists of a stationary lower member 57, preferably forming an integral part of the carriage 25, and a movable upper member 58. Said upper member is hinged to said lower member by the hinge connection 59. Said lower member 57 is provided with a screw threaded opening 60, and a thumb-screw 61, is passed downwardly through said upper member 58, to screw into said threaded opening 60, to thereby hold said upper member in gripping or clamping relation to said lower member. A spring pressed upwardly projected lift-pin 62 may be mounted in said lower member to bear upwardly against said upper member to separate said parts when the holding pressure of said thumb-screw 61 is relaxed. The clamp or vise elements $b$ and $b'$ are provided with key gripping means particularly adapted to engage and hold pin or cylinder lock keys. In connection with the lower member 57, the said gripping means comprises a gripping jaw 63 which borders the forward longitudinal edge of the member 57, and which extends rearwardly to a longitudinal step or stop shoulder 64. The outer end of said lower member 57 is cut away flush with said gripping jaw 63, and is provided with a rearwardly indented slot 65. Fulcrumed on a pivot pin or screw 66 entered transversely through said slot 65, is a positioning stop-finger 67, having at its free end a right-angled stop-lug 68. Said stop-finger possesses a slot through which said pivot pin or screw 66 extends, so that not only may the stop-finger be turned on the pivot, but may also be longitudinally adjusted thereon. The lower free end of said stop-finger 67 is further provided with a laterally and outwardly projecting knob 69 by which it may be grasped when manipulating the same. Said stop-finger normally depends vertically from said pivot pin or screw 66, so as to be out of the way during the key-cutting operations. In connection with the upper member 58, said gripping means comprises, along its free longitudinally edge, an upper depending gripping jaw 70, to co-operate with the gripping jaw 63 of the lower member 57.

In utilizing the key cutting machine to cut the ordinary bit-key, the master or pattern key is engaged in the clamp or vise element $a$, and the blank key to be cut is engaged in the clamp or vise element $a'$. To so engage the keys, the thumb-screws 46 are relaxed, so that the upper members 43 will be raised relative to the lower member 42, and their gripping means sufficiently separated to permit the insertion of the keys. The pins of the keys are inserted endwise between the pin-seats 50 and 56 until the shoulders of the keys fetch up against the outer sides of the clamp or vise elements, and with the bits of the keys projecting forward and outward between the gripping jaws 51 and 54. When the keys are thus positioned, the thumb-screws 46 are screwed down to force the upper members 43 down toward the lower members 42, so as to hold the same clamped together, with the keys firmly gripped and securely held against movement. When the keys are thus operatively engaged by the clamp or vise elements $a$ and $a'$, the gauge 32 may be adjusted in proper relation to the clamp or vise element $a$, according to the size of the key-bit, by manipulating the adjusting screws 33 and 34. When such adjustments are satisfactory, the operator applies the power to the spindle 13 to rotate the cutters, and thereupon registers the bit of the master or pattern key with the gauge 32 according to the cut to be made, by moving the carriage 25 transversely to bring the bit in proper position relative to the gauge 32. The operator now moves the carriage 22 forward, thus carrying the key-blank, which is in the clamp or vise element $a'$, into engagement with the rotating cutting tool 17, which cuts into the bit thereof, until the operation is completed by the corresponding notch of the master or pattern key fetching up in stopped relation to the gauge 32. The latter operations are continued until the desired notches are produced in the key blank in correspondence to the notches in the master or pattern key.

The engagement of a bit key, such as above described, with the clamp or vise elements, is clearly illustrated in Figs. 1, 2, 4, 5 and 6 of the drawings.

When it is desired to cut a flat key, the clamp or vise elements $a$ and $a'$ are utilized. In such case, the flat key is entered upon the lower gripping jaw 52, with the back of the key alined and stopped against the stop shoulder 53, whereupon the upper member 43 is lowered by the thumb-nut 46 until its gripping jaw 54 is brought down upon the key body, to clamp or grip the latter between the same and said lower gripping jaw 52. This arrangement is illustrated more particularly in Figs. 7 and 8 of the drawings. The manipulation of the machine in cutting said flat keys is substantially the same as above described.

Figure 3:
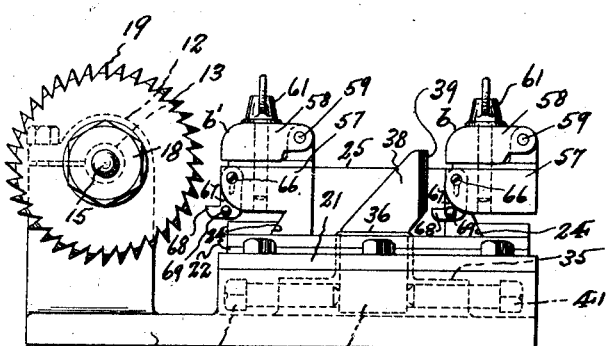
Fig. 3 is an opposite side elevation of the same.

When it is desired to cut a pin or cylinder lock key, which is provided with the well-known V-shaped notches in its operative edge, the clamp or vise elements $b$ and $b'$ are utilized. Since it is desirable in cutting such keys, that the blank key and the master or pattern key be precisely located in exactly the same relative positions in the respective clamp or vise elements, I have provided the latter elements with positioning stop means whereby such result is assured. The upper clamp members 58 having been relaxed, so that the keys may be engaged on the lower clamp jaws 52, with their backs abutting the stop-shoulders 53, by inserting the keys endwise between the separated gripping jaws 52 and 54, the operator, prior to thus inserting the keys, raises the positioning stop-finger 67 to horizontal forwardly projecting position, with the stop-lug 68 disposed in upwardly projecting and outwardly offset position. The stop-finger 67 being thus positioned (as shown in Fig. 9), the key blank is inserted until its shoulder fetches up against the stop-lug 68, thus assuring, with respect to each clamp or vise element, that the keys will occupy exactly the same relative longitudinal positions therein. The gauge 38 may be adjusted relative to the master or pattern key, whereby the proper presentation of the key blank to the cutting element 19 may be assured. After the keys are properly secured in the clamp or vise elements $b$ and $b'$, by screwing down the thumb-screws 61, the positioning stop-fingers are released, so that the same drop down out of the way, as shown in Fig. 3, whereupon the carriages 22 and 25 may be manipulated to move the master or pattern key relative to the gauge 38 so as to simultaneously present the key blank to be cut to the cutting element 19.

From the above description it will be apparent that the novel key cutting machine is of the universal type, that is, it may be utilized in cutting most of the well known forms of key blanks, its clamp or vise elements and associated cutting elements being arranged to that end.

Having thus described my invention, I claim:—

In a key cutting machine having rotary cutting means and a carriage mechanism universally movable relative to said cutting means provided with longitudinally alined vise elements respectively for pattern keys and key blanks, and a gauge means opposed to said pattern key vise element; each vise element comprising a lower member, an upper member pivoted thereto, a clamp screw for said members, said lower member having a counter sunk lower gripping jaw along its forward edge, said lower gripping jaw being bounded for a portion of its length and at its rear side by a stop-shoulder, said upper member also having an upper gripping jaw along its forward edge for opposition to said lower gripping jaw, and both said lower and upper members having in alinement with and to the rear of their gripping jaws at one end thereof semi-cylindrical pin-seats to embrace the pin portions of a bit key inserted therebetween.

In testimony, that I claim the invention set forth above I have hereunto set my hand this 11th day of November, 1925.

JOSEPH SCHECHTER.